April 19, 1966   W. G. PRICE ETAL   3,246,866
SHOCK ABSORBING SUPPORT
Filed Nov. 12, 1964   4 Sheets-Sheet 1

INVENTORS
WILLIAM G. PRICE
RICHARD G. POWELL
GEORGE E. FREDERICK

BY Samuel J Snyder
ATTORNEY

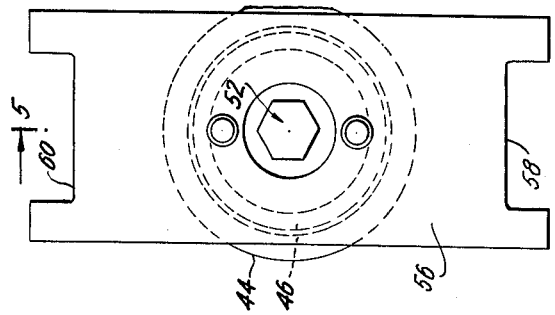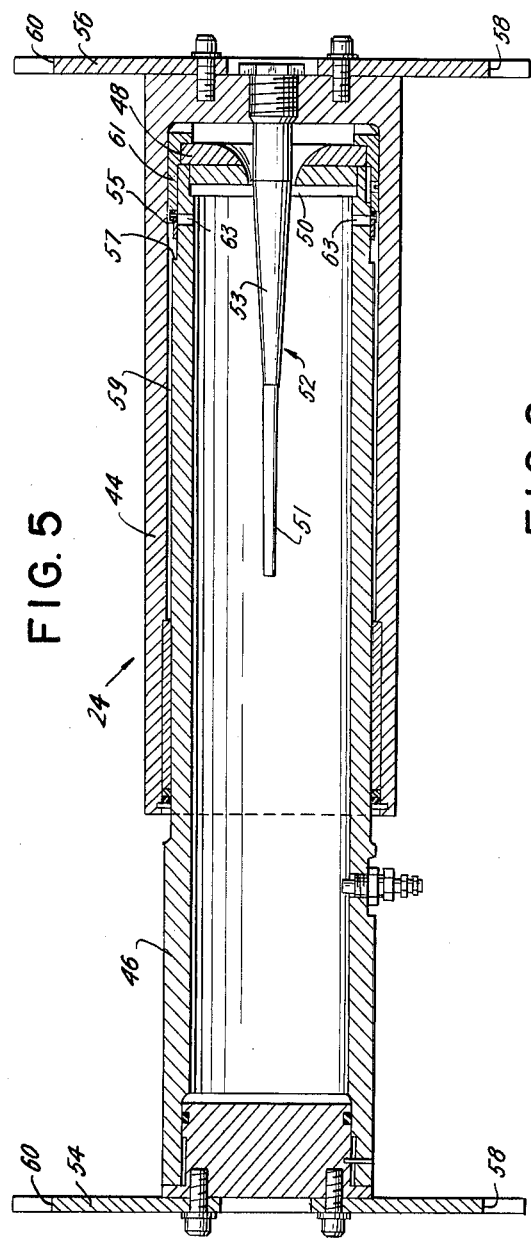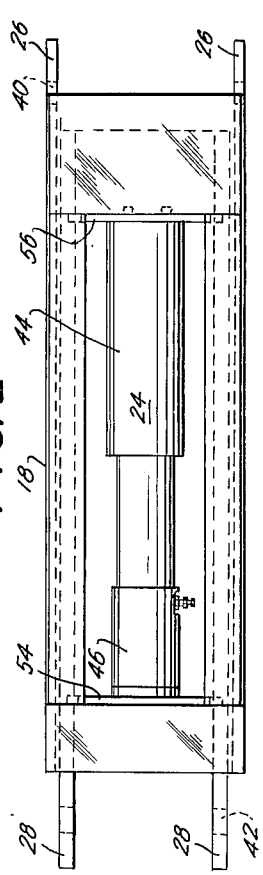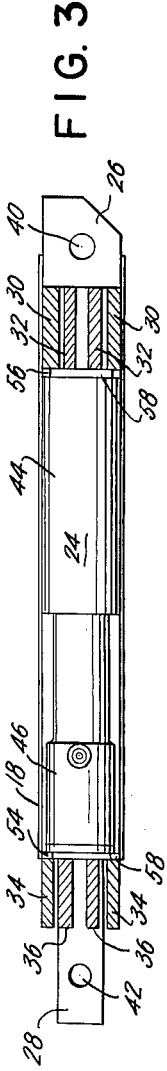

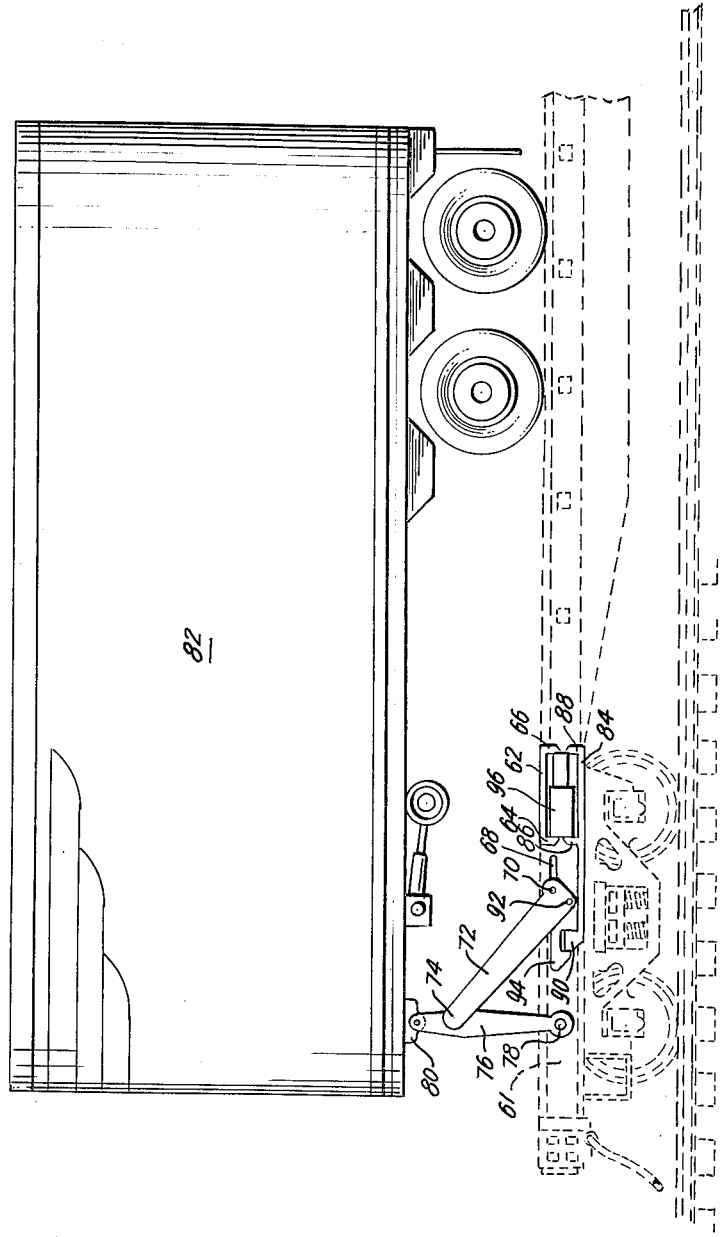

April 19, 1966  W. G. PRICE ETAL  3,246,866
SHOCK ABSORBING SUPPORT

Filed Nov. 12, 1964  4 Sheets-Sheet 4

INVENTORS
WILLIAM G. PRICE
RICHARD G. POWELL
GEORGE E. FREDERICK

BY *Samuel J. Snyder*
ATTORNEY

United States Patent Office 3,246,866
Patented Apr. 19, 1966

3,246,866
SHOCK ABSORBING SUPPORT
William G. Price, South Bend, Ind., Richard G. Powell, Houston, Tex., and George E. Frederick, South Bend, Ind., assignors to ACF Industries, Incorporated, New York, N.Y., a corporation of New Jersey
Filed Nov. 12, 1964, Ser. No. 410,483
3 Claims. (Cl. 248—119)

This application is a continuation-in-part of application Serial No. 182,429, filed March 26, 1962, now abandoned.

This invention relates generally to shock absorbing trailer supports and more particularly to energy dissipating shock absorbing supports for use on railway vehicles adapted to transport motor truck semi-trailers.

The trend to use the railroad cars to transport motor trucks' semi-trailers between points which normally constitute the longer hauls and the likelihood of damage to goods carried in this manner has emphasized the need for suitable shock absorbing means acting between the semi-trailers and the railway vehicles to cushion and damp shocks or sudden movements of the semi-trailers. It will be appreciated, however, that an adequate shock absorbing means acting between the railway vehicle and the semi-trailers must be extremely rugged because of the tremendous inertial forces created by the weight of the loaded semi-trailers. Such a shock absorbing means to be practical should be readily accessible for servicing, easily assembled, and relatively inexpensive to manufacture.

It is therefore an object of this invention to provide a novel shock absorbing means of extremely rugged construction adapted to act between a railway vehicle and the semi-trailers to be carried thereon to absorb the shock due to sudden changes in movement of said vehicle, thereby cushioning the semi-trailers and the goods carried thereby.

It is a further object of this invention to combine an energy dissipating shock absorbing means with a fifth wheel support pivotally mounted to a railway vehicle and provided with means to receive and anchor the king pins or fifth wheel connection of the semi-trailer carried on said vehicles.

Still another object of this invention is to provide a railway car with a long travel storke, non-oscillatory shock absorbing means for a pivoting support for receipt of the king pin of a semi-trailer, which pivoting support is movable between a storage position and an erected position.

In the drawings:

FIGURE 2 is a plan view of the diagonal frame assembly for the support;

FIGURE 3 is a side view of the frame assembly of FIGURE 2;

FIGURE 5 is a plan sectional view of the shock absorber of the present invention;

FIGURE 6 is an end view of the shock absorber assembly that is to be placed within the diagonal leg of the present invention;

FIGURE 7 is a schematic broken side view of a railway car showing another embodiment employing a modified fifth wheel supporting arrangement for cushioning a semi-trailer on a railway car;

Figure 1:
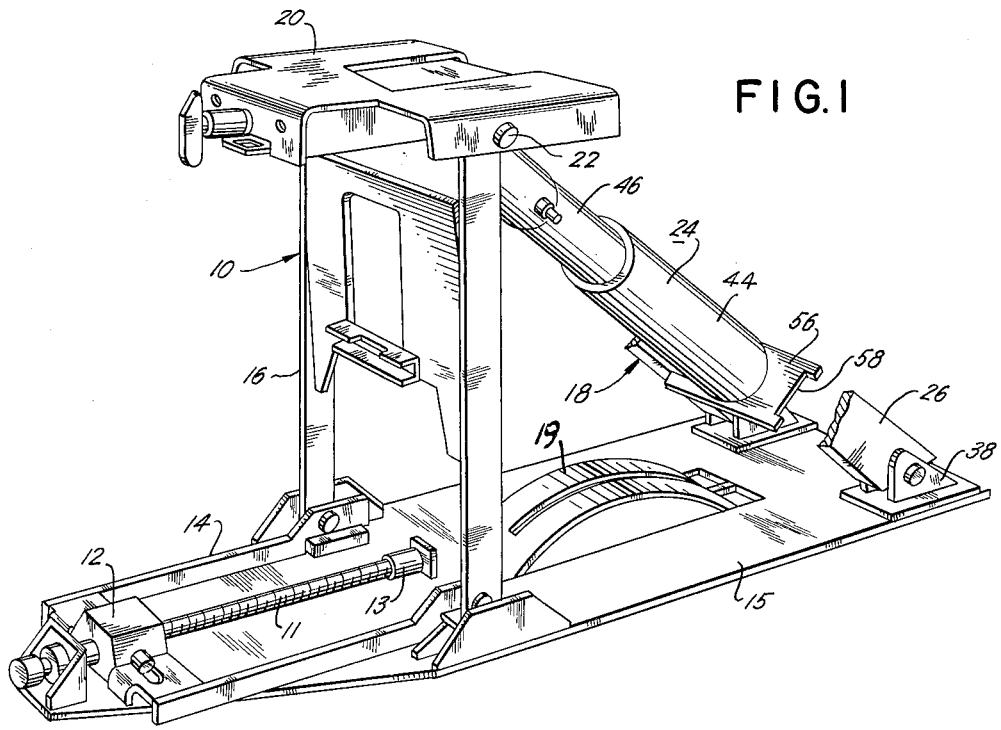
FIGURE 1 is a perspective view of a support pivotally mounted on a railway car for locking a semi-trailer to the car with an energy dissipating shock absorbing means in a diagonal frame assembly of said support.

Referring to FIGURE 1, a hitch or support device 10 for the fifth wheel of a semi-trailer is adapted to be fixed to the deck of a railway car in any suitable manner, and is generally similar to the trailer hitch disclosed in Patent 3,145,006, dated August 18, 1964. Support device 10 is shown having a screw 11 and a nut assembly 12. The screw is seated in a collar 13 fixed to plate 15. The screw and nut assembly 11, 12 are adapted to move horizontal frame structure 14 rearwardly, which in turn pivots vertical brace 16 downwardly to a stored position, due to the connection of diagonal frame assembly or leg 18 with the fifth wheel plate 20 about its pivot connection 22 with the vertical support member 16. With such a pivoting arrangement as mentioned, the diagonally disposed shock absorber 24 is very slightly, if at all, compacted during the stowing of the fifth wheel plate 20, which means that the shock absorber 24 does not offer resistance to the stowing of the fifth wheel plate 20. By turning screw 11, support device 10 can be lowered to an inoperative position adjacent the deck of the railway car on which it is mounted, or raised to the operative position shown in FIG. 1. Spring 19 acting against diagonal leg 18 aids in lifting support device 10.

Figure 4:
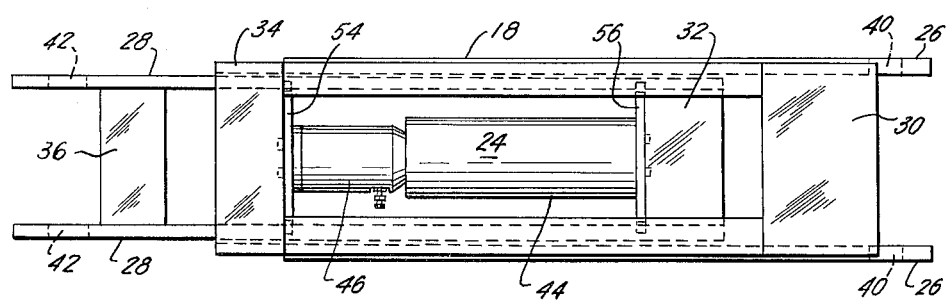
FIGURE 4 is a plan view of the diagonal frame assembly in its fully extended position, such as would occur upon the application of a load to the semi-trailer.

The construction of the diagonal frame assembly is seen in more detail in FIGURES 2, 3, and 4, as including two pairs of rails 26 and 28 with rails 26 being spaced a greater distance than the rails 28 so that rails 28 may fit within the confines of rails 26. The rails 26 are spaced at one end by upper and lower transversely extending plates 30 whereas the rails 28 are spaced by upper and lower normally extending plates 32 such that the rails 28 and plates 32 fit within the parallelogram described by rails 26 and upper and lower normally extending plates 30. Similar structure is provided at an opposite end of the diagonal brace 18 where the rails 26 are connected by normally extending plates 34 and the rails 28 are connected by normally extending plates 36. Thus, the paired rails 26 and 28 with the normally extending plates at either end thereof define a box outline, and in this box outline a shock absorber 24 is fitted. The rails 26 are pivotally connected with brackets 38, as in FIGURE 1, through the openings 40 adjacent the ends of said rails; whereas the rails 28 are connected with the pivot pin 22 through the openings 42 adjacent the extending ends of rails 28.

Shock absorber 24 is particularly shown in FIGURES 5 and 6 as including cylinder 44 and telescoping tubular member 46 with an end wall or diaphragm 48, said end wall having an orifice 50 therein through which a metering pin 52 extends upon compaction of shock absorber 24. The shock absorber assembly also includes end plates 54 and 56. As seen in FIGURE 6, the end plates are each provided with channels 58 and 60 through which rails 28 extend to confine end plates 54 and 56 between rails 28. Plates 30 and 34 form fixed abutment stops for plates 56 and 54, respectively. Thus, as may be seen, shock absorber 24 is confined by the rails 28 and plates 32 and 36, as well as by rails 26 and plates 30 and 34.

Any load applied to the support 10 will cause compaction of the shock absorber unit 24, for rails 28 will reciprocate within the rails 26 and plates 32 and 36 will cause plates 56 and 54, respectively, to move toward one another, as seen in FIGURE 4. As both ends of the frame assembly are open, rails 28 may move in the direction opposite to that of FIGURE 4 whereby plate 54 is urged towards plate 56.

As is also true with the railroad cars themselves, the semi-trailers can be loaded in varying amounts. This makes undesirable the use of a shock absorber having constant force travel characteristics, which type of shock absorber is quite capable of efficiently absorbing under one load condition, namely that load condition for which such a unit was designed, which is usually the maximum load. Therefore, the metering pin 52 is provided with different taper angles. As seen in FIGURE 5, a small taper angle 51 is provided in the fore part of pin 52 and a greater taper angle 53 is provided in the aft portion of the pin 52. These angles have been chosen because of the probable widely varying conditions of loading of the semi-trailer which is to be carried by the railroad car. Such conditions may vary from a light load of 15,000 lbs. to a heavy load of around 60,000 lbs. or more. Thus, the fore part of pin 52 provides a low force travel relationship for lightly loaded semi-trailers; whereas the increasing taper portion 53 is adequate to limit the force travel relationship for a maximally loaded semi-trailer.

The positioning of shock absorber 24 in diagonal frame assembly 18 allows the simplification of the unit for there is no need for a floating piston, such as piston 102 in Patent No. 2,994,442 of G. E. Frederick, to separate the highly compressed air from the hydraulic fluid, as the air forms in the upper portion of the unit with the hydraulic fluid below it when unit 24 is inclined, as shown in FIGURE 1, where the support 10 is in its operative position to hold a semi-trailer to a railroad car bed. The charge of hydraulic fluid is sufficient to cover the orifice 50 when unit 24 is inclined, as shown in FIGURE 1, as this allows the unit to dissipate energy at the beginning of its stroke as well as to store enough energy by compression of the air therein to return the unit to its non-compacted position. Shock absorber unit 24 incorporates a snubbing device 55 that seats against stop 57 during contractile movement of the unit 24 to allow freedom of flow of hydraulic fluid into chamber 59 about the telescoping member 46. However, upon extension of unit 24 snubbing device 55 is caused to seat against the collar 61, which fixes the wall 48 to the member 46. In this position the fluid in chamber 59 has to flow therefrom by way of small orifices in snubbing device 55 to orifices 63. Thus, the unit 24 cannot rapidly extend to create a serious oscillation of the support 10, which we have found can be as harmful as the original impact forces. The snubbing arrangement is similar to that shown in Patent No. 2,944,442.

Figure 8:
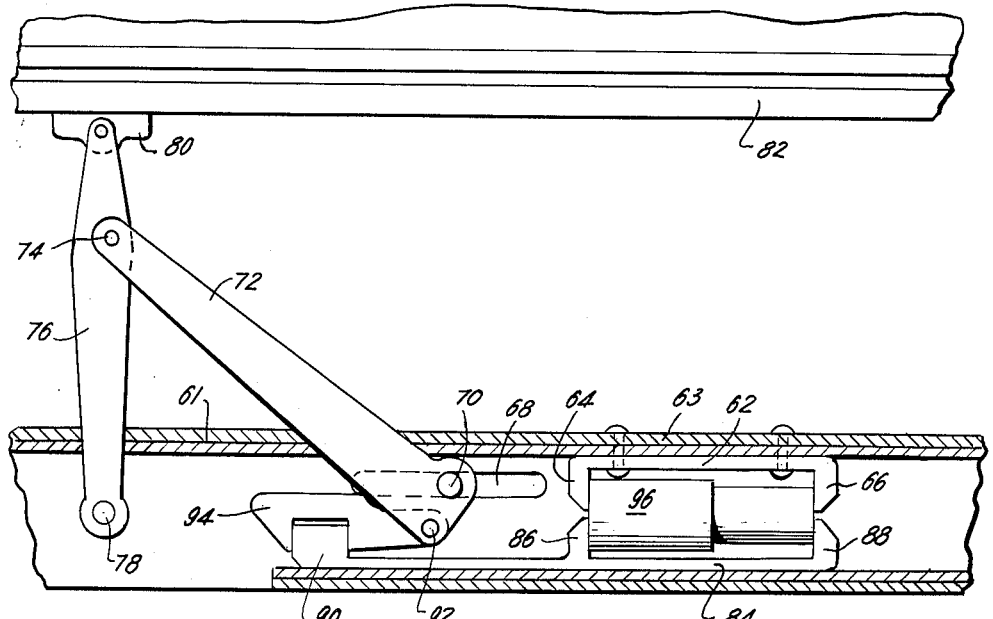
FIGURE 8 is an enlarged side view of the structure of the embodiment of FIGURE 7 for supporting a semi-trailer.
Figure 9:
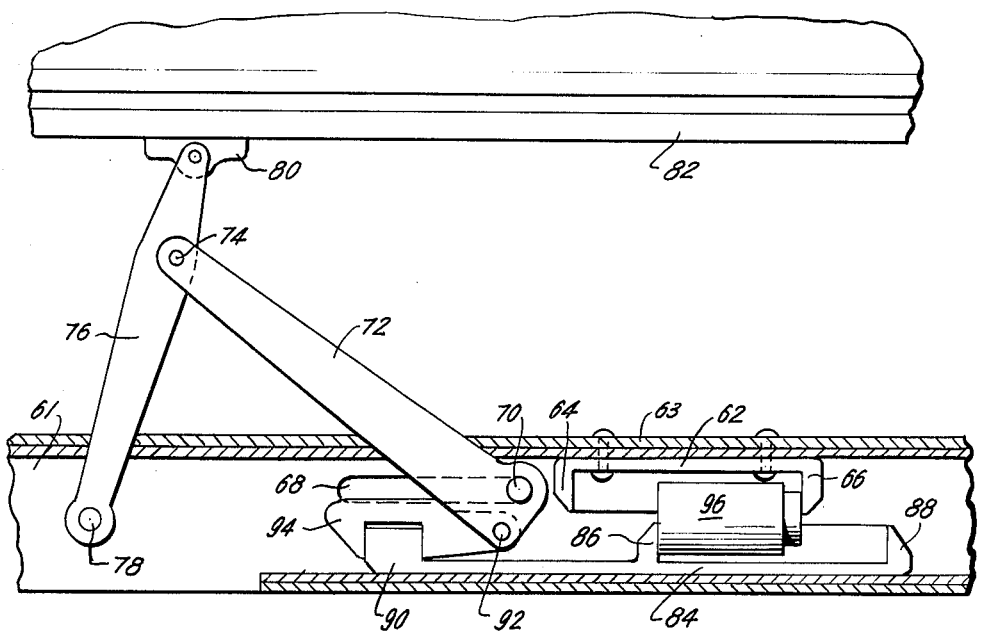
FIGURE 9 is an enlarged side view of the embodiment of FIGURE 7 showing a load applied to the semi-trailer to compress the shock absorber of this embodiment between fixed stops provided therewith.

FIG. 7 shows another embodiment of the invention in which a flat car capable of receiving a semi-trailer is is fitted to secure a semi-trailer in position in such a manner that loads imparted thereto by the railway care are absorbed by a cushioning mechanism. A railway flat car having a center sill 61 is provided with a stop member 62 in the form of an inverted box having downwardly depending sides 64 and 66 acting as stops, which box member may be welded, riveted, or otherwise secured to the car bed 63 and the sill 61 as seen in FIGURES 8 and 9. The existing sill structure or an element fixed to the car may be slotted as at 68 for the receipt of a pin 70 carrying a diagonal brace 72 that is pivoted, as at 74, to a vertical leg or brace 76 which is pivotally mounted, as at 78, to the railroad car. The vertical brace 76 carries a plate 80 for engaging a trailer kingpin and serving as a fifth wheel anchoring means for a semi-trailer body 82, much as the face plate 20 of the support structure 10 functions. Support plate 80 is not shown in detail, since it may be of any suitable known type, such as that shown in Patent No. 3,145,006. A reciprocating member 84 is provided having upwardly extending a rectangular box whose sides 86 and 88 act as stops and member 84 also has an upwardly extending end 90. The diagonal brace 72 carries a pin 92 which secures a locking pawl 94. The locking pawl 94, when engaged with the upwardly extending end 90 of the reciprocating member 84, transmits the loads applied to plate 80 on the vertical brace 76 so that they may be absorbed by shock absorber 96. This shock absorber is of the same general type as that described above, but since it operates in a horizontal position instead of an inclined position, it requires a floating piston separating the compressed air from the hydraulic fluid as shown in FIG. 5 of Patent No. 2,994,442. Shock absorber 96 is placed within the confines of the box members 62 and 84 whereby downwardly depending sides 64 and 66 limit the travel of the shock absorber as urged by the upwardly depending sides 86 and 88.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. A trailer hitch for supporting a highway trailer and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a trailer engaging and supporting platform pivotally supported by said leg members, means pivotally mounting the lower portions of said leg members on the car, means for mounting the lower portion of one of said leg member for movement lengthwise of the car and relative to the lower portion of the other leg member, a hydraulic shock absorber connected to the car and said one leg member for providing cushioning action of the trailer on the car, said shock absorber including a compressible fluid, and means for mounting said shock absorber so that it is compressed by either buff or draft shocks, said mounting means including opposed recessed members having their recessed sides facing each other and one of said recessed members being fixedly connected to said car and the other of said recessed members being movable longitudinally and having a longitudinally extending portion, said recessed members having front and rear end walls and said shock absorber being located in said recessed members in abutment with said walls so that the end walls of the fixed member serve as stops and the end walls of the movable member actuate said shock absorber, said one leg member including means for releasably connecting it to said longitudinally extending portion, whereby said compressible fluid serves to extend the shock absorber and thereby restore said legs to their normal position after a shock.

2. In a railroad vehicle the combination with a wheeled railroad car bed of a fifth wheel stand carried by said railroad car bed comprising: a vertical strut pivoted to the car bed; a horizontal plate structure associated with said vertical strut opposite its pivotal attachment with said car bed; a diagonal frame assembly pivotally connected to the car bed and to the horizontal plate structure, said diagonal frame assembly including an inner and outer frame structure of rails connected at both ends by plates so that one frame unit of a pair of rails and connecting plates is slidable within the other frame unit of a pair of rails and connecting plates; an energy dissipative shock absorber, said shock absorbed having two chambers with one of said chambers being filled with a compressible fluid and a hydraulic fluid with the compressible fluid on top of said hydraulic fluid when said diagonal frame assembly is raised to its angular position with respect to said car bed to provide a return spring means for said shock absorber; and a pair of end plates connected to the shock absorber, said end plates being cut out to accommodate the inner frame rails of said diagonal frame assembly and being in abutting relationship with the inner and outer frame rail connecting plates so that the shock absorber is contained by said diagonal frame assembly and compressed by any movement of the inner frame within the outer frame.

3. In a railroad vehicle the combination with a wheeled railroad car bed of a fifth wheel stand carried by said railroad car bed comprising: a vertical strut pivoted at one end to the car bed; a horizontal plate structure pivotally connected to the other end of said vertical strut; a diagonal leg assembly pivoted to the car bed and to the vertical strut; said diagonal leg assembly including interengaging relatively slidable frames; an energy dissipative shock absorber mounted in said frames; said shock absorber having two chambers with one of said chambers being filled with a compressed gas and a hydraulic fluid whereby the gas provides a return means for said shock absorber, a pair of end members connected to the shock absorber, said end members being in abutting relationship with the inner and outer frames so that said shock absorber is compressed by any movement of the inner frame within the outer frame.

References Cited by the Examiner

UNITED STATES PATENTS

| | | | |
|---|---|---|---|
| 2,916,283 | 12/1959 | Westcott | 267—64 |
| 2,963,175 | 12/1960 | Thorahill | 213—223 |
| 2,994,442 | 8/1961 | Frederick | 213—43 |
| 3,003,434 | 10/1961 | Clejan | 105—368 |
| 3,003,436 | 10/1961 | Peterson | 105—454 |
| 3,050,320 | 8/1962 | Clejan | 287—20 |
| 3,073,586 | 1/1963 | Hartel | 267—64 |
| 3,087,748 | 4/1963 | Livelsberger et al | 287—20 |

FOREIGN PATENTS

| | | |
|---|---|---|
| 1,119,771 | 4/1956 | France. |
| 830,410 | 3/1960 | Great Britain. |

CLAUDE A. LE ROY, *Primary Examiner.*

FRANK L. ABBOTT, *Examiner.*

R. P. SEITTER, *Assistant Examiner.*